(12) United States Patent
Tourapis et al.

(10) Patent No.: US 8,073,048 B2
(45) Date of Patent: Dec. 6, 2011

(54) METHOD AND APPARATUS FOR MINIMIZING NUMBER OF REFERENCE PICTURES USED FOR INTER-CODING

(75) Inventors: Alexandros Tourapis, West Windsor, NJ (US); Jill MacDonald Boyce, Manalapan, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1373 days.

(21) Appl. No.: 10/569,168

(22) PCT Filed: Aug. 24, 2004

(86) PCT No.: PCT/US2004/027432
§ 371 (c)(1),
(2), (4) Date: Feb. 22, 2006

(87) PCT Pub. No.: WO2005/022923
PCT Pub. Date: Mar. 10, 2005

(65) Prior Publication Data
US 2007/0019724 A1    Jan. 25, 2007

Related U.S. Application Data

(60) Provisional application No. 60/497,814, filed on Aug. 26, 2003.

(51) Int. Cl.
*H04N 7/12* (2006.01)
(52) U.S. Cl. .................................. 375/240.01; 348/700
(58) Field of Classification Search ............. 375/240.12, 375/240.15, 240.16, 240.01; 348/700
See application file for complete search history.

(56) References Cited

U.S. PATENT DOCUMENTS

2001/0046265 A1  11/2001  Assaf
(Continued)

FOREIGN PATENT DOCUMENTS

EP          0 606 675 A     7/1994
(Continued)

OTHER PUBLICATIONS

Search Report dtd. Apr. 1, 2005.
(Continued)

*Primary Examiner* — Emmanuel Bayard
(74) *Attorney, Agent, or Firm* — Robert D. Shedd; Paul P. Kiel

(57) ABSTRACT

A method for minimizing and optimizing a list of active reference pictures to be used for (forward or backward) inter coding of a current picture, or of a pixel region (e.g., video object) within the current picture. Setting the number of active reference pictures in a list equal to one based upon one or more decisions related to the pixel data and movement between the current picture and one or more reference pictures. Otherwise, minimizing the number of active reference pictures in the list based upon one or more other decisions related to the pixel data and movement between the current picture and one or more reference pictures. Minimizing the number of active reference pictures in a second reference picture list based upon the utilization of reference pictures in the first reference picture list. A video encoder processes data representing a two-dimensional video image which has been produced by a conventional commercially available video camera. The video encoder is adapted to determine, select, and to minimize the number of active reference pictures to be used to inter code a current picture. The bit stream transmitted by the encoder can be decoded by decoders of the related art.

34 Claims, 4 Drawing Sheets

U.S. PATENT DOCUMENTS

| | | | |
|---|---|---|---|
| 2002/0034249 A1* | 3/2002 | Kadono et al. | 375/240.12 |
| 2004/0247031 A1* | 12/2004 | Hagai et al. | 375/240.16 |
| 2006/0165175 A1* | 7/2006 | Yin | 375/240.16 |
| 2006/0262845 A1* | 11/2006 | Prakash et al. | 375/240.01 |
| 2007/0211802 A1* | 9/2007 | Kikuchi et al. | 375/240.16 |
| 2008/0063075 A1* | 3/2008 | Kondo et al. | 375/240.16 |
| 2010/0074335 A1* | 3/2010 | Kadono et al. | 375/240.15 |

FOREIGN PATENT DOCUMENTS

| | | |
|---|---|---|
| JP | 10-224795 | 8/1998 |
| WO | WO 02/15585 A | 2/2002 |

OTHER PUBLICATIONS

Text of Final Committee Draft of Joint Video Specification (ITU-T REC. H.264/ISO/IEC 14496-10 AVC)International Organization for Standardization—Organization for Standardization—Organisation Internationale De Normalisation, XX, XX, Jul. 2002 pp. I-XV, 1, XP001100641 oaragraph 7. 4. 2. 2.

Smolic A. et al. "Long-Term Global Motion Estimation and Its Application for Sprite Coding, Content Description, and Segmentation" IEEE Transactions on Circuits and Systems for Video Technology, IEEE Inc. New York, US vol. 9, No. 8 Dec. 1999 pp. 1227-1242 xp000873447 issn: 1051-8215 Paragraph OIII.

Tourapis A M et al. Direct Mode Coding for Bi-Predictive Pictures in the JVT Standard ISCAS 2003. Proceedings of the 2003 IEEE International Symposium on Circuits and Systems, Bangkok, Thailand May 25-28, 2003 IEEE International Symposium on Circuits and Systems, New York, NY IEEE US vol. 2 of 5, May 25, 2003 pp. 11-700, XP001189209 ISBN: 0-7803-7761-3 paragraph 0002.

ITU-Recommendation H.263—Video Coding for Low Bit Rate Communication ITU-T Draft Recommendation H.263, XX, XX, Feb. 1998 p. 33, 86, 98, XP002199785 oaragraphs ON.2, Video, Source, Coding, Algorithm, figure N.1 paragraph N.4.1.4 Temporal Reference for Prediction.

Yi J. Liang et al.: Low-Latency Video Transmission Over Lossy Packet Networks Using Rate-Distortion Optimized Reference Picture Selection Proceedings 2002 International Conference on Image Processing, ICIP 2002. Rochester, NY Sep. 22-25, 2002, International Conference on Image Processing, New York, NY IEEE, US vol. 2 of 3, Sep. 22, 2002 pp. 181-184, XP010607938 ISBN: 0-7803-7622-6 Paragraph 0003.

Huang, et al., "Analysis and Reduction of Reference Frames for Motion Estimation in MPEG-4 AVC/JVT/H.264", ICASSP 2003, Taiwan, 2003, pp. 145-148.

* cited by examiner

METHOD AND APPARATUS FOR MINIMIZING NUMBER OF REFERENCE PICTURES USED FOR INTER-CODING

CROSS-REFERENCE TO RELATED APPLICATION

This application claims the benefit, under 35 U.S.C. §365 of International Application PCT/US04/027432, filed Aug. 24, 2004, which was published in accordance with PCT Article 21(2) on Mar. 10, 2005 in English and which claims the benefit of U.S. provisional patent application No. 60/497,814, filed Aug. 26, 2003.

FIELD OF THE INVENTION

The invention relates generally to digital video encoding techniques, and more particularly to inter coding of macroblocks of a picture, in a multiple reference picture standard, for digital video encoding applications.

BACKGROUND OF THE INVENTION

A video encoder can be used to encode one or more frames of an image sequence into digital information. This digital information may then be transmitted to a receiver, where the image or the image sequence can then be reconstructed. The transmission channel itself may be over any of a number of mediums; for example (for illustrative purposes only and not meant to be an exclusive listing), the medium may comprise a wireless broadcast, a radio link, a satellite link, coaxial cable television or data, fiber optic, mobile phone connection, or fixed line telephone link, the Internet, or a combination of these or other mediums.

Various international standards have been agreed upon for video encoding and transmission. In general, a standard provides rules for compressing and encoding data relating to frames of an image. These rules provide a way of compressing and encoding image data to transmit less data than the viewing camera originally provided about the image. This reduced volume of data then requires less channel bandwidth for transmission. A receiver can re-construct the image from the transmitted data if it knows the rules (that is, the standard) that the transmitted data conformed to. The H. 264 standard avoids redundant transmission of parts of the image, by using motion compensated prediction of macroblocks from previous frames.

Video compression architectures and standards, such as MPEG-2 and JVT/H.264/MPEG 4 Part10/AVC, encode macroblocks using only either an intraframe ("intra") coding or an interframe ("inter") coding method for the encoding of each macroblock. For interframe motion estimation/compensation, a video frame to be encoded is partitioned into non-overlapping rectangular, or most commonly, square blocks of pixels. For each of these blocks, the best matching same-shaped block is searched from a reference frame in a predetermined search window according to a specified matching error criterion. Then the matched block is used to predict the current block, and the prediction error block is further processed and transmitted to the decoder. The relative shifts in the horizontal and vertical directions of the reference block with respect to the original block are grouped and referred to as the motion vector (MV) of the original block, which is also transmitted to the decoder. The main aim of motion estimation is to predict a motion vector such that the difference block obtained from taking a difference of the reference and current blocks produces the lowest number of bits in encoding.

Recent video coding standards and architectures employ multiple reference pictures for motion estimation and compensation in an attempt to improve coding efficiency. Predictively coded pictures (called "P" pictures) in MPEG-2 and its predecessors use only one previous picture to predict the values in a current picture. The H.264 standard allows the usage of multiple reference pictures (or frames), which are usually pictures at different time instants, many of which can be spatially and temporally unrelated to the current picture. In MPEG-2 only a single reference index is used, while for the encoding of motion vectors a special code named the f-code parameter is also transmitted within the bitstream for every picture that is used for the determination and decoding of the motion vectors. This f-code parameter is derived during the motion estimation process, and affects the VLC coding of the motion vectors. Previous proposals for automatically adapting the f-code parameter for every picture, depending upon its motion parameters and range, could achieve better coding efficiency, when compared to keeping the parameter fixed. H.264, does not support this parameter, and essentially uses predefined VLC codes for the encoding of the motion vectors. On the other hand, H.264 allows multiple reference use, therefore a reference index parameter is also transmitted.

The use of multiple references can increase considerably the complexity of the encoder, since more pictures need to be examined during the motion estimation process. The H.264 standard allows an encoder to select, for motion compensation purposes, among a larger number of pictures that have been decoded and stored in the decoder. The same extension of referencing capability is also applied to motion-compensated bi-prediction, which is restricted in MPEG-2 to using two specific pictures only (one of these being the previous intra (I) or P picture in display order and the other being the next I or P picture in display order).

Typically, the encoder calculates appropriate motion vectors and other data elements represented in the video data stream. The process for inter prediction of a macroblock in the encoder can involve the selection of the picture to be used as the reference picture from a number of stored previously decoded pictures. A "reference index" specifies the location (index) in a reference picture list (list 0 or list 1) of the reference picture to be used for prediction of an inter coded macroblock. A "reference index" is an index of a list of variables (PicNum and LongTermPicNum) that identify selected pictures for a frame sequence, which is called a reference picture list. When decoding a P or SP slice, there is a single reference picture list RefPicList0. When decoding a B slice, there is a second independent reference picture list RefPicList1 in addition to RefPicList0. Which pictures are actually located in each reference picture list is an issue of the multi-picture buffer control. A picture can be marked as "unused for reference" by the sliding window reference picture marking process, a first-in, first-out mechanism, and thereafter will not be listed in either of the reference picture lists. The H.264 standard allows reordering of the references within reference lists.

Multiple reference-picture motion-compensated prediction requires both encoder and decoder to store the reference pictures used for inter prediction in a multi-picture buffer. The decoder replicates the multi-picture buffer of the encoder according to memory management control operations specified in the bitstream. If the size of the multi-picture buffer is set to one picture and if the maximum reference index for list0 or list1 is not signaled to be equal to one, the reference index at which the reference picture is located inside the multi-picture buffer has to be signaled with each inter coded macroblock transmitted.

Because the reference index must to be signaled within the bitstream, for every inter coded microblock, or macroblock partition (e.g., subblocks of 16×8, 8×16 or 8×8 pixels) when the size of the reference picture list is larger than one picture, it is not always certain that multiple references will increase compression gain in the encoding of a particular picture (e.g., a picture may be biased towards only a single reference). For an inter coded macroblock (or subblock), one motion vector difference and one reference index may be present in the bitstream. For a Bi-predictively inter coded macroblock (or subblock), two motion vector differences and two reference indices may be present in the bitstream. Considering for example that for each macroblock in H.264 it is possible to transmit up to 4 reference indices for Predictive (P) pictures, and 8 for Bi-directionally (B) predictive pictures, the bitrate overhead due to the reference indices can be quite significant.

In H.264, the number of references is controlled through the num_ref_idx_lN_active_minus1 parameter that is signaled at the slice level, wherein N is equal to 0 for list0 and 1 for list1. The num_ref_idx_lN_active_minus1 parameter specifies the maximum reference index for reference picture list N that shall be used to decode each slice of the picture in which list N is used (e.g., num_ref_idx_l0_active_minus1 specifies the maximum reference index for reference picture list 0 that shall be used to decode the slice). The value of num_reg_idx_lN_active_minus1 ranges between 0 and 31, inclusive. If this parameter is equal to 0, then for the current slice, only one reference picture will be used to inter code the macroblocks in that slice and no reference index needs to be transmitted with the inter coded macroblocks of that slice.

SUMMARY OF THE INVENTION

It would be desirable to adapt a video encoder to be able to dynamically determine the number of references prior to encoding a given picture, because if only one reference is used the aforementioned bit overhead (for the reference indices for each macroblock) would be eliminated or reduced, possibly providing improved encoder performance, while reducing complexity since fewer reference pictures would have to be tested during motion estimation.

Therefore, the present invention is a method and apparatus that enables a video encoder to adaptively (dynamically in a running encode real time basis) select the number of reference pictures that are to be used for the inter coding of a macroblock. The number of references decision may be based on previously generated information, such as current-reference picture correlation, reference picture motion vectors, residuals, etc, and/or this decision can be based upon a Rate-Distortion Optimization method. Embodiments of the present invention may provide for improved compression gain and/or encoding efficiency.

One embodiment of the invention provides for a method of inter coding a pixel region of a current picture in a video sequence of pictures, the sequence including a plurality of references listed in at least one reference list, the method comprising: the step of selecting the first reference listed in a reference list to be used as the only reference to be used to encode the pixel region of the current picture. In this case, the num_reg_idx_lN_active_minus1 may be set equal to zero, wherein N represents the number of the reference list. This may result in the use of the reference which is closest in time to the current picture containing the pixel region to be encoded.

Another embodiment of the invention provides for a method of inter coding a current picture in a video sequence of pictures, the sequence including a plurality of references listed in a reference list, the method comprising selecting the first reference listed in the reference list to be used as the only reference to be used to encode the current picture.

Another embodiment of the invention provides for a method of inter coding a current picture in a video sequence of pictures using at least one of a plurality of reference pictures listed in a list of active references, the method comprising: the step of removing at least one of the listed references from the list of active references based upon a comparison of each of the removed references to the current picture. Then, num_ref_idx_lN_active_minus1 (where N represents the number of the list of active references) may be reduced accordingly. The comparison is a direct comparison, such as measuring distortion by calculating the sum of absolute pixel differences between the current picture and each removed reference. Alternatively, the comparison may be an Indirect comparison, such as by removing a second reference picture from a list of active references if the second reference picture has high distortion compared to a first reference picture, and the first reference picture has low distortion compared to the current picture.

Another embodiment of the invention provides for a method of inter coding a current picture using at least one of a plurality of reference pictures listed in a list of active references, the method comprising: the step of reordering the listed references so that reference pictures having smaller distortion relative to the current picture are listed with higher priority in the list of active references.

Another embodiment of the invention provides an encoder for encoding pixel data as a plurality of block transform coefficients, the encoder comprising a circuit adapted to minimize a list of active references to be used to inter code a current picture based upon the methods disclosed herein. The encoder may be further adapted to reorder a list of active pictures so that the remaining active reference pictures having smaller distortion relative to the current picture shall placed with higher priority In the reference picture list.

Another embodiment of the invention provides for a method of inter coding a video sequence of pictures, the method comprising: performing a first coding step of encoding the current picture using all reference pictures listed in a reference picture list; a step of selecting and removing one or more pictures from the reference list to create a new reference list; and then performing a second coding step of re-coding the current picture using only the pictures listed in the new reference list.

Another embodiment of the invention provides for a method of encoding for compressing and encoding a video sequence of images, the method comprising: the step of inter coding the current picture K times, using K permutations of M reference pictures, where K is equal to:

$$K \leq \sum_{i=1...M} \frac{M!}{(M-i)!}$$

and then; the step of selecting one encoded current picture, from among the K encoded current pictures, based upon predetermined criteria in comparison with the other K−1 encoded current pictures.

Another embodiment of the invention provides for a method of inter coding a video sequence of pictures, the method comprising: the step of performing motion estimation coding of a current picture using each of a plurality of permutations of available references and selecting the permutation of available references that minimizes a predetermined condition which may be either bitrate, distortion, or weighted combination of bitrate and distortion.

Another embodiment of the Invention provides for an encoder for encoding a video sequence of images, the encoder comprising a reference picture buffer, wherein the encoder is adapted to inter code a current picture in the sequence of pictures using at least one of a plurality of reference pictures stored in the reference picture buffer and listed in a reference list; wherein the encoder is further adapted to dynamically select the first listed reference to be used as the only reference to be used to inter code the current picture based upon predetermined criteria.

Another embodiment of the invention provides for an encoder for encoding a sequence of images, the encoder comprising a reference buffer, wherein the encoder is adapted to inter code a current picture using at least one of a plurality of reference pictures listed in the reference buffer, and adapted to dynamically, reorder a list of references stored in the reference buffer so that reference pictures having smaller distortion relative to the current picture are listed with higher priority in the list of active references.

Another embodiment of the invention provides for a multimedia terminal in which is included a means for obtaining a digital video sequence; and a video encoder arranged to perform the encoding method described herein.

Another embodiment of the invention provides for a computer-usable medium having computer-readable program code embodied therein for enabling a computer system to perform the encoding method described herein.

Another embodiment of the invention provides for a recording medium that stores a program, readable by a computer, for causing a computer system to perform the encoding method described herein.

Throughout the following description it will be assumed that the luminance (luma) component of a macroblock comprises 16×16 pixels arranged as an array of 4 8×8 blocks, and that the associated chrominance components are spatially sub-sampled by a factor of two in the horizontal and vertical directions to form 8×8 blocks. Extension of the description to other block sizes and other sub-sampling schemes would be apparent to those of ordinary skill in the art. The invention is not limited by the 16×16 macroblock structure but can be used in any segmentation based video coding system.

BRIEF DESCRIPTION OF THE DRAWINGS

The above features of the present invention will become more apparent by describing in detail exemplary embodiments thereof with reference to the attached drawings in which.

DETAILED DESCRIPTION

Figure 1:
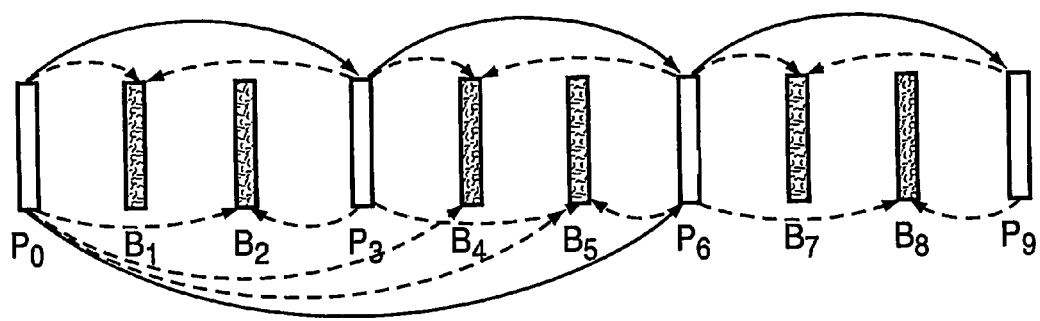
FIG. 1 depicts a series of pictures to be coded and selected for use as inter coding references, in accordance with the principle, of the present invention.

FIG. 1 depicts a series of temporally sequential pictures ($P_0, B_1, B_2, P_3, B_4, B_5, P_6, B_7, B_8, P_9$) to be coded and selected for use as inter coding references in accordance with the principles of the invention. Picture $P_0$ is intra coded, and is used as a reference for subsequent inter coded pictures $B_1, B_2, P_3, B_4, B_5, P_6$; Picture $B_1$ is Bi-predictively inter coded using only a single reference picture for each prediction ($P_0$ is the single reference used for the forward prediction; $P_3$ is the single reference used for the backward prediction). Picture $B_2$ is Bi-predictively inter coded using only a single reference picture for each prediction ($P_0$ is the single reference used for the forward prediction; $P_3$ is the single reference used for the backward prediction). Picture $P_3$ is mono-predictively inter coded, using only a single reference picture $P_0$ for its (forward) prediction. Picture $B_4$ is Bi-predictively inter coded using two reference pictures ($P_0$ and $P_3$) for its forward prediction and a single reference picture ($P_6$) for its backward prediction. Picture $B_5$ is Bi-predictively inter coded using two reference pictures ($P_0$ and $P_3$) for its forward prediction and a single reference picture ($P_6$) for its backward prediction. Picture $P_6$ is mono-predictively inter coded, using two reference pictures ($P_0$ and $P_3$) for its forward prediction. Picture $B_7$ is Bi-predictively inter coded using only a single reference picture for each prediction ($P_6$ is the single reference used for the forward prediction; $P_9$ is the single reference used for the backward prediction). Picture $B_8$ is Bi-predictively inter coded using only a single reference picture for each prediction ($P_6$ is the single reference used for the forward prediction; $P_9$ is the single reference used for the backward prediction). Picture $P_9$ is mono-predictively inter coded, using only a single reference picture $P_6$ for its forward (e.g., list 0) prediction.

In each of the inter coded pictures $B_1, B_2, P_3, B_7, B_8$, and $P_9$ there is no need to encode a reference index with motion vectors for each macroblock or macroblock partition, because each is encoded using only a single reference picture from its corresponding reference picture list(s) (one reference list for P-pictures; two reference lists for B-pictures).

In accordance with the principles of the present invention, a method is disclosed for determining and limiting the number of references that will be used for the predictive or bi-predictive inter coding of the current picture, based upon pixel and motion characteristics of the current picture and further based upon the active/available reference pictures.

One method, in accordance with an embodiment of the invention, for selecting the number of references used for inter coding a given picture would be to encode the current picture in a first pass using all active (listed) references, and then finally in a second pass recode the picture using only the referenced pictures while removing all others from the corresponding active reference list. For example, performing a first coding step of encoding the current picture using all reference pictures listed in a reference picture list and selecting and removing one or more pictures from the reference list to create a new reference list; and then re-coding the current picture using only the pictures listed in the new reference list. This may result in each reference list being more compact, and consequently in the reference indices potentially requiring fewer bits.

An additional consideration could be made on whether the number of macroblocks or blocks that reference a given indexed reference picture satisfies a given condition/threshold TMB. If this condition/threshold is not satisfied, this insufficiently referenced reference picture shall be removed from the active reference buffer, and the macroblocks/blocks of the current picture are then predicted (re-encoded) from the remaining active (listed) reference pictures. Although such methods could potentially lead to better gain, they also introduce considerably higher complexity because a picture needs to be coded twice. This is especially burdensome in codecs such as H.264, due to their already very high complexity. Nevertheless, in a more brute force approach, it is possible also to try and encode the same picture K times, using from 1 to M references where K is equal to:

$$K \leq \sum_{i=1\ldots M} \frac{M!}{(M-i)!}$$

which denotes all possible arrangements and combinations (permutations) of picture references, including reordering. From these K combinations, we can select the one that gives the least distortion, or bitrate, or use rate-distortion optimization criteria (a Lagrangian formulation) wherein distortion is weighted against rate using a Lagrange multiplier (e.g. through the use of Lagrangian multipliers in the form of $J=D+\lambda \times R$). A Lagrangian multiplier is an algebraic term that arises in the context of problems of mathematical optimization subject to constraints.

Other embodiments of the invention provide simpler methodologies for deciding the number of picture references, without significantly reducing encoding quality (without increasing distortion) or bitrate. We have found that high correlation exists between the number of references (and the reference indices) used when coding the current picture with the number of references (and reference indices) used in the adjacent previously coded pictures used as references to encode a current picture. This correlation increases when the two pictures are of high similarity (e.g. their absolute difference is below a given relatively small threshold). For example, if the immediate previously coded picture at time t−1, referencing only the previous picture at t−2, has little motion, and is very similar to the current picture at time t (e.g. the picture mean absolute difference, PMAD<4) this makes it very likely that the current picture would advantageously be encoded using a single reference picture. The reference frames can be either preceding or following the current frame. Thus, in general if the first picture P1 is encoded referencing only a single reference picture RP and has little motion relative to reference picture RP (e.g., P1-RP PMAD<4), and if the first picture P1 is very similar to the current picture CP (e.g., P1-CP PMAD<4), then the current picture CP may also be efficiently encoded referencing only a single reference picture (e.g., either P1 or RP) and the current picture CP, and all of its included slices and macroblocks, will be encoded using a single reference picture (e.g., either P1 or RP0). Preferably, pictures RP, P1, and CP will be immediately adjacent pictures, but need not be immediately adjacent pictures. An additional simple comparison (e.g. absolute difference) between the current picture, and the remaining references could also be performed to further confirm this decision. Additionally, the motion vectors and reference indices of not only the closest reference picture but also of all other references could be considered for making or verifying this decision.

Exemplary embodiments of the method of the present invention provide for the following methodologies for selecting and reducing the number of active references:

First, perform a distortion calculation: Compute the current picture's CP sum of absolute differences (PSAD) relative to the first reference (zero reference) picture in the given list (list0 or list1), at the block or macroblock level. The picture SAD value (PSAD) is the sum of all the macroblock SAD values (MBSAD). A macroblock SAD value (MBSAD) is the sum of absolute differences (SAD) of the pixels within a single macroblock relative to a corresponding macroblock in the other picture). The CP-RP picture SAD difference (CP-RP PSAD) may be computed using either the original of the reference picture RP, or the reconstructed reference picture $RP_{rc}$. Preferably, compute (by division) the CP and RP pictures' mean absolute difference (CP-RP PMAD) as a measure of distortion between the entire current picture and the first reference (zero reference) picture in the given list (list0 or list1). The pictures' MAD value (PMAD) is the mean absolute difference (MAD) between pixels of the two pictures being compared. The relation between the pictures' SAD value (PSAD) and the pictures' MAD value (PMAD) is that picture MAD (PMAD) is equal to the picture SAD value (PSAD) divided by a number, e.g., by dividing by the number of macroblocks, (or of pixels) in either one of the two pictures. The picture MAD value (PMAD) is thus a normalized version of the picture SAD value (PSAD), and the picture SAD value (PSAD) may be normalized on a macroblock level such that the picture MAD value (PMAD) is defined as the mean (average) SAD value (MBSAD) between corresponding macroblocks (of the two pictures), by dividing the pictures' SAD value (PSAD) by the number of macroblocks in the picture. Thus, PMAD and PSAD values may be used interchangeably if any threshold values to be compared with these values are appropriately scaled.

If the pictures' MAD value (CP-RP0 PMAD) (i.e., the MAD between the entire current picture CP and the entire first listed reference picture RP0) is below a relatively small first threshold value $T_1$, then select One as the number of references (in the applicable list list0 or list1) to be used for encoding the current picture, (e.g., by setting num_reg_idx_I-N_active_minus1 equal to 0). In addition, if the percentage R of the macroblocks of the current picture having a macroblock SAD value MBSAD below a second threshold value $T_2$ is equal to or greater than a predetermined threshold percentage $T_R$ (e.g., $T_R$ equal to 95%), then a single reference is used, (num_reg_idx_IN_active_minus1 is set to 0). Thus, if either one or both of the threshold conditions defined by $T_1$ or by $T_R$ and $T_2$ are met, a single reference picture in the list N (list0 or list1) shall be used for encoding the current picture (e.g., the num_reg_idx_IN_active_minus1 applicable to that list is set to 0).

If a reconstructed reference picture $RP_{rc}$ is used for comparison with the current picture in the distortion calculation, considering that this Is also affected by the quantization process, $T_1$ and $T_2$ should be adjusted/scaled accordingly, for example, by predefining specific weights that correspond to quantization parameters QP and redefining $T_1$ and $T_2$ as $T_1(QP)=a(QP) \times T_1$ and $T_2(QP)=b(QP) \times T_2$ where $a(\ )$ and $b(\ )$ are the predefined weights indexed by quantization parameters QP.

If neither of the above distortion conditions is true, but the pictures' MAD value (CP-RP0 PMAD) satisfies a different threshold $T_3$ (e.g., $T_1 \leq PMAD < T_3$) or if the macroblock SAD value (MBSAD) of a percentage H of macroblocks satisfying a different threshold $T_4$ (e.g., $T_2 \leq MBSAD < T_4$) exceeds a predetermined threshold percentage $T_H$, then we also evaluate the motion vectors and reference indices encoded for the first reference picture: If the percentage $K_1$ of macroblocks of the first reference picture having reference indices equal to zero exceeds a predetermined a threshold percentage $T_{K1}$, then only a single reference picture (the first reference picture) shall be used to encode the current picture, (and num_reg_idx_IN_active_minus1 is accordingly set to zero).

Optionally, for further optimization, the following decision can be made: If all or a percentage of motion vectors used to encode the first reference picture in the list are small enough (indicating low motion activity), then a single reference picture (the first reference picture) is used for encoding the current picture. For example, if a percentage $K_2$, of the blocks in the picture using the zero reference (RP0) and having motion vector components $MV_x$ and $MV_y$ lying in the target range of $[-mx_1, mx_2]$ and $[my_1, my_2]$ (e.g. $mx_1=mx_2=my_1=my_2=1$) respectively, are greater than a predetermined threshold percentage $T_{K2}$, (e.g. $T_{K2}\% \leq T_{K1}\%$), then a single reference (e.g., RP0) in a given list (e.g., list 0) shall be used to encode the current picture.

If none of the above prescribed conditions are satisfied, the remaining references in the applicable reference list may be also compared to the current picture (e.g., by calculation of the pictures' SAD values PSAD or Block/Macroblock MAD values MBMAD). If the pictures' MAD value $PMAD_i$ for reference i (where i is the index of the reference picture list) relative to the current picture is above a threshold $T_5$ or all macroblocks therein have a macroblock SAD value of MBSAD, larger than a threshold $T_6$, then this reference shall be removed from the list of active references (e.g., reference buffer) used for encoding the current picture. Similarly, motion vectors and reference indices (incrementing reference index) from the closest to furthest reference can be successively considered and assist in the decision, by also adapting the values of $T_5$ and $T_6$. For example, if a reference picture is not used for encoding another reference picture that is closer to the current picture, then these thresholds may be reduced (reduction of the thresholds implies that reference has higher probability to be removed from the references examined).

Since the distortion values for a reference picture compared to the reference pictures used to encode it may have already been computed for that picture's number of references decision, these distortion values, may be reused in an additional decision methodology. In particular, if it is already known that a given reference picture is very similar to the current picture, but has high distortion compared to a second reference picture, then it is very likely that the current picture will have high distortion value versus that second reference picture and the distortion calculation may be obviated, and that second reference picture may be removed from the buffer of "active" references that will be used to encode the current picture. However, consideration of the distortion (or the residual if available) between these two references after motion compensation would probably lead to a more reliable decision and to better performance.

Finally, it is also possible using the generated statistics (e.g., distortion of each reference in the reference list relative to the current picture) to perform a reordering of the references in the applicable reference list such that references with smaller distortion relative to the current picture are placed with higher priority (smaller index numbers) in the reference list. And then, num_reg_idx_IN_active_minus1 may optionally be set to a number (e.g., greater than 1) that inactivates the reference pictures having the highest distortion from being used as references for the encoding of the current picture. In the H.264 standard, reordering the reference pictures in the reference list can be performed by signaling the reference picture list reordering elements (see H.264 Standard section 7.3.3.1). In other embodiments of the invention, other known and future methods for estimating distortion between reference pictures could also be employed and such could be combined with weighted prediction strategies.

Unlike conventional techniques, the MPEG-4 standard provides an object-based technique of compressing moving pictures and enables individual coding of an object having an arbitrary shape. In the traditional frame-based video coding approach, the "real world" is represented by a set of rectangular temporally correlated frames, the rectangular frame being the smallest unit that can be independently encoded or displayed or manipulated by the user.

In an object-based video coding framework, such as the MPEG4 architecture, a scene is no longer seen as a set of rectangular frames with a given spatial and temporal resolution, but instead, it is understood as a composition of visual objects (VOs) of natural and synthetic origin, typically with different characteristics and semantic relevance. Each object is independently coded and generates an elementary stream that can be independently accessed, thus providing the user the capability to access and interact with semantically meaningful objects. In terms of data, and relatively to the frame-based scenario, there is additionally the shape data, which defines the shape of each object, and the scene description data that specifies which objects are in the scene and the way the scene is organized. Thus, MPEG4 allows representing 2D arbitrarily shaped natural video objects by means of a sequence of Video Object Planes (VOP). For each VOP, shape, texture and motion data is encoded. Texture coding is DCT based (8×8 blocks) and motion compensation is macroblock or block based (16×16 or 8×8 blocks). As for the shape, it is encoded using Content-based Arithmetic Encoding (CAE). Since the various scene objects are independently encoded, generating separate elementary streams, it is possible to select for each video object an optimal number of references for use in Inter-coding the blocks of that object.

Since, in the object-based coding framework, the various objects in a scene are now independent entities in terms of coding, although building together a scene, it will be understood by persons skilled in the art that principles of the invention can be extended from frame-based coding to object-based video compression techniques wherein a plurality of video objects (VO) within a scene are to be individually coded. In the case of object-based encoding, the foregoing method may be separately applied to each individually coded video object, rather than being applied to each whole picture or to a whole slice therein.

For example, a "background" video object (e.g., having little or no inter-frame motion) might be coded as a separate video object using only a single frame as a reference according to the above disclosed embodiments of the Invention, while another object (a moving object, such as a person) displayed in the same scene might be encoded using a plurality of frames, as performed in yet another embodiment of the invention more particularly described below. Thus, a person or other moving object in a same scene, to be superimposed over the "background" object, might be encoded using a plurality of reference pictures (or a single reference picture), based upon its own characteristics, while the background object is encoded using only a single reference picture (or a plurality of reference pictures). If the blocks of a particular object can be advantageously encoded using only a single reference picture as determined according to the methods disclosed herein, then the blocks of a particular object may be accordingly encoded using only a single reference.

Further, if the sequence of transmitted pictures includes a single real frame that provides a depiction of every pixel of a particular, (e.g., "background"), object, or a synthetic frame (a frame that is not a reproduction of an actual real image within the video picture sequence but contains a depiction of all of the pixels of the particular "background" object) can be constructed (synthesized) from the transmitted pictures, then that real frame or synthetic frame may be selected (to be used as a reference for encoding a motion-shifted counterpart of the same video object in one or a plurality of other frames)

according to the method herein disclosed, as the single reference to be used to encode the "background" object.

Thus, where the method of the present invention is to be applied to object-based encoding, the above described methodologies may be adapted by persons skilled the art to support making object-based number-of-reference decisions instead of number-of-reference decisions based upon comparisons of whole pictures. For example, instead of computing the SAD value between two whole pictures (PSAD), the SAD value between the two VOP representations of a particular video object (VOSAD) would be computed, and used for Object-based number-of-reference decision making instead of using the PSAD value as in the foregoing methodologies. Similarly, it follows that the normalized pictures' SAD value (PMAD) (i.e., the MAD between the entire current picture and the entire first listed reference picture) would be replaced with a object-based MAD value (VOMAD). Macroblock based motion estimation in object-based encoding may be performed by comparing a particular block (e.g., macroblock) within in a video object in a current picture, sampled at a first time, with a motion-shifted corresponding similarly sized block (e.g., macroblock) within the same video object in a reference picture, sampled at a second time. Thus, computations and decisions in the disclosed methodologies may be readily applied to object-based encoding. For example, if the pictures' MAD value PMAD for reference i (where i is the index of the reference picture list) relative to the current picture is above a threshold $T_5$ or all macroblocks therein have a macroblock SAD value of MBSAD, larger than a threshold $T_6$, then this reference shall be removed from the references (e.g., reference buffer) used for encoding the pixel region (e.g., video object) in the current picture.

Thus, the methodologies of the present invention may be generally described as being calculations and number-of-references decisions based upon the characteristics of "pixel regions" to be individually encoded where the dimensions of the pixel regions may be varied, (depending upon whether frame-based or object-based encoding is performed), between the full rectangular dimensions of whole pictures, or being more limited to a smaller area within the shape-boundaries of a particular video object. In some embodiments of the invention, and in the claims following, the term "pixel region" also includes a slice or a field of a current picture or of a current video object to be encoded. Thus, the method of the invention provides for inter coding a pixel region of a current Image in a video sequence of images using at least one of a plurality of references listed in a reference list, the method comprising: the step of dynamically selecting the first listed reference to be used as the only reference to be used to inter code the pixel region of the current picture. The pixel region may include all of the pixels of the (rectangular) current picture, or a smaller (e.g., non-rectangular) area such as a video object, or a slice or a field. The first listed reference may be the reference among the plurality of listed references being closest in time to the current image containing the pixel region to be inter coded.

Figure 2:
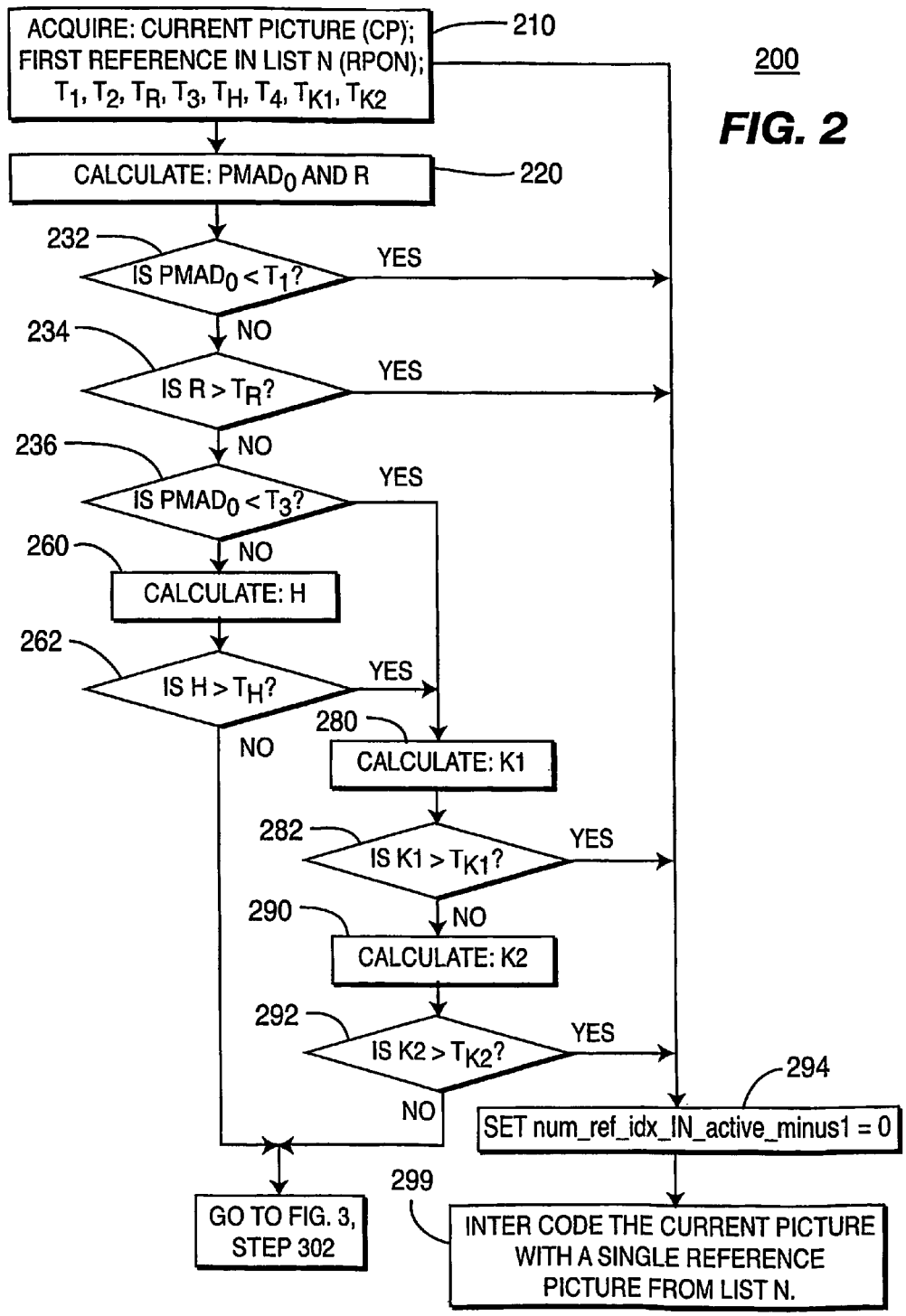
FIG. 2 is a flow chart illustrating methodologies for deciding to use only a single (one) reference picture for each (backward or forward) prediction used to inter code a current picture.

FIG. 2 depicts a series 200 of exemplary methodologies for determining whether to use only a single (one) reference picture for each (backward or forward) prediction used to inter code a current P or B picture, thus embodying principles of the invention. In each flowchart herein (e.g., FIGS. 2 and 3), "YES" marks each branch of a decision step that is used when the comparison or statement Indicated within the associated diamond (decision block) is TRUE. Conversely, "NO" marks a branch of a decision step that is used when the comparison or statement indicated within the associated diamond (decision block) is FALSE.

An acquisition step 210 acquires all the variable data, including pixel data of a current picture (CP) and of the first reference RPON (zero reference) in the applicable (backward or forward) reference list N, and the various threshold values to be employed in making the decisions $T_1, T_2, T_R, T_3, T_H, T_4, T_{K1}, T_{K2}$.

A distortion calculation step 220 is performed by computing the mean absolute difference (PMAD) between macroblocks of the current picture CP and the first reference (zero reference) picture RPON in the given list N (list0 or list1). The CP-RPON PMAD may be computed using either the original of the reference picture RP, or the reconstructed reference picture $RP_{rc}$. (Note that the PMAD calculation step 220 implies the computation of each macroblock SAD value MBSAD for the macroblocks in the pictures, which is information used in the following decision steps e.g., 234,262).

In decision step 232, if the PMAD value (CP-RPON PMAD) between the entire current picture CP and the entire first listed reference picture RP0 (on a macroblock level) is below a relatively small first threshold value $T_1$, then the YES branch is chosen and the reference limiting step 294 is next performed, whereby the number of references (in the applicable list list0 or list1) to be used for encoding that current picture Is set to be One, (e.g., by setting num_reg_idx_IN_active_minus1 equal to 0). The current picture will then be inter coded in coding step 299 using only a single reference picture (the zero reference in list N) for the applicable (forward or backward) prediction. In decision step 232, if instead the first threshold value $T_1$ is exceeded by the CP-RPON PMAD, then subsequent decision steps (e.g., 234) are performed to determine if by other criteria the current picture should be inter coded using only a single reference picture (the zero reference in list N) for the applicable (forward or backward) prediction.

In decision step 234, if the percentage R of the macroblocks of the current picture CP having a macroblock SAD value MBSAD below a second threshold value $T_2$ is equal to or greater than a predetermined threshold percentage $T_R$ (e.g., $T_R$ equal to 95%), then the YES branch is chosen and the reference limiting step 294 and the encoding step 299 are next performed.

In decision step 236, if the pictures' MAD value (CP-RPON PMAD) as calculated in calculation step 220 satisfies a different threshold $T_3$ (e.g., $T_2 \leq PMAD < T_3$) then the YES branch is chosen and the motion vectors and reference indices encoded for the first reference picture are evaluated in subsequent steps 280, 290, and 292. In decision step 236, if instead the pictures' MAD value does not satisfies threshold $T_3$ then subsequent calculation step 260 and decision steps (e.g., 262) are performed.

In calculation step 260, the percentage H of macroblocks whose macroblock SAD values MBSAD satisfy a different threshold $T_4$ (e.g., $T_2 \leq MBSAD < T_4$), is calculated for use in ensuing decision step 262l In decision step 262, if the macroblock SAD value (MBSAD) of a percentage H of macroblocks satisfying a different threshold $T_4$ (e.g., $T_2 \leq MBSAD < T_4$) exceeds a predetermined threshold percentage $T_H$, then the YES branch is chosen and the motion vectors and reference indices encoded for the first reference picture are evaluated in subsequent steps 280, 290, and 292.

In decision step 262, if instead percentage H does not exceed the predetermined threshold percentage $T_H$, then subsequent steps (including those beginning at step 302 of FIG. 3) may be performed to reduce the number of active references to be used to encode the current picture to a number greater than one.

In calculation step 280, the percentage $K_1$ of macroblocks of the first reference picture having reference indices equal to zero, is calculated for use in ensuing decision step 282. In decision step 282, if the percentage $K_1$ of macroblocks of the first reference picture having reference indices equal to zero exceeds a predetermined threshold percentage $T_{K1}$, then the YES branch is chosen and the reference limiting step 294 and the encoding step 299 are next performed. In decision step 282, if instead the percentage $K_1$ does not satisfy the predetermined threshold percentage $T_{K1}$, then subsequent calculation step 290 and decision steps (e.g., 292) are performed.

In calculation step 290, the percentage $K_2$ of the blocks in the picture using the zero reference (RP0) and having motion vector components $MV_x$ and $MV_y$ lying in the target range of [$-mx_1$, $mx_2$] and [$my_1$, $my_2$] (e.g. $mx_1=mx_2=my_1=my_2=1$) respectively, is calculated for use in ensuing decision step 292. In decision step 292, percentage $K_2$ is greater than a predetermined threshold percentage $T_{K2}$, then the YES branch is chosen and the reference limiting step 294 and the encoding step 299 are next performed. In decision step 292, if instead percentage $K_2$ is not greater than a predetermined threshold percentage $T_{K2}$, then subsequent steps (including those beginning at step 302 of FIG. 3) may be performed to reduce the number of active references to be used to encode the current picture to a number greater than one.

Figure 3:
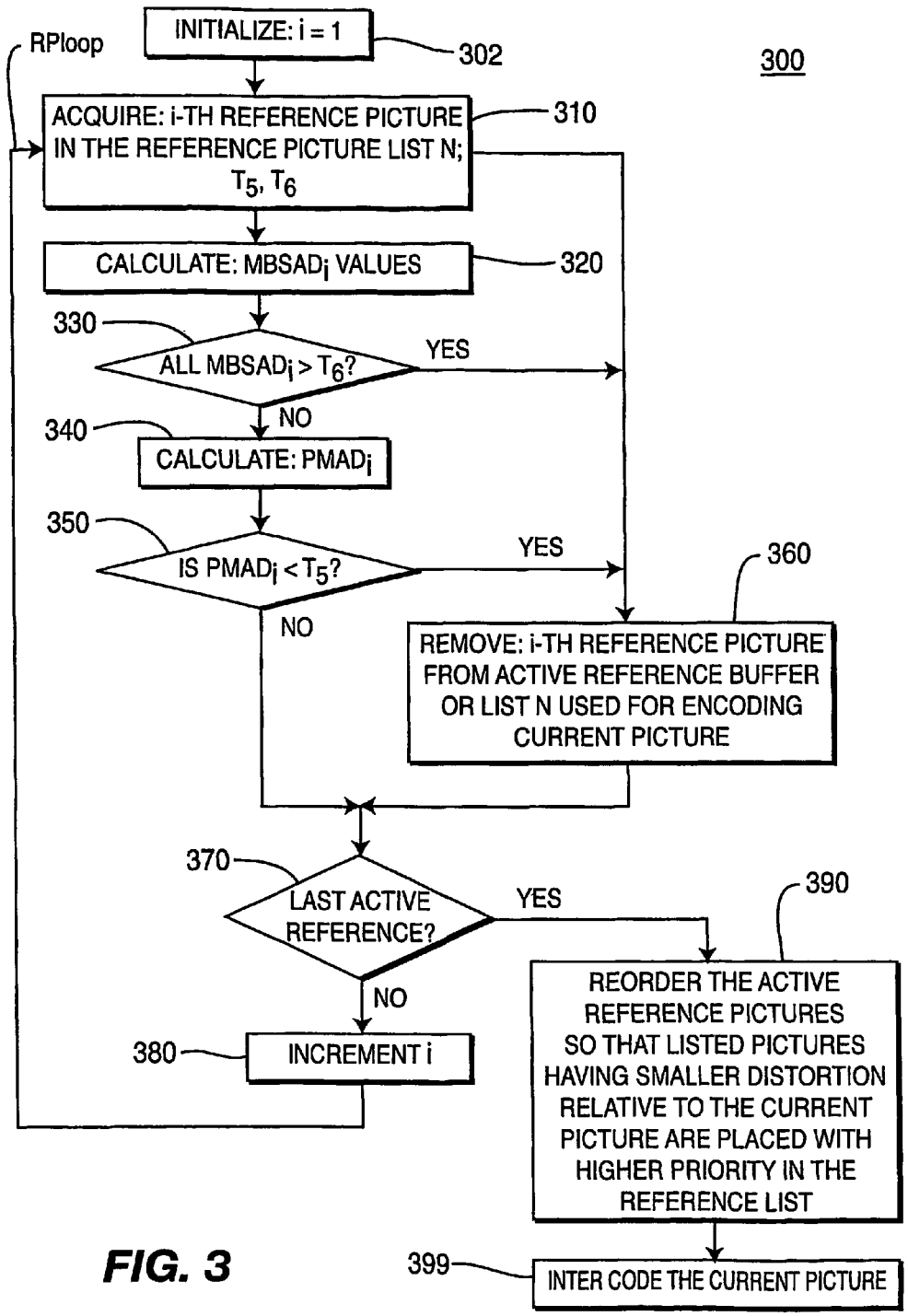
FIG. 3 is a flow chart illustrating methodologies for removing reference, pictures from the list of active reference pictures to be used to (forward or backward) inter code a current picture.

FIG. 3 depicts a series 300 of exemplary methodologies to reduce the number of active references to be used (for each available list) to encode the current picture to a number greater than one reference picture, embodying the principles of the invention. The methodologies 300 of FIG. 3 are to be employed when none, of the methodologies 200 of FIG. 2 have resulted in a decision to use only a single (one) reference picture for each (backward or forward) prediction used to inter code a current P (or B) picture.

FIG. 3 includes a loop RPloop that repeats for each reference picture in an active reference list N until the last active reference picture is detected (e.g., "Last Active Reference?" equals "YES"), and includes steps 310, 320, 330, 340, 350, 360 that may be performed in order to remove reference pictures from the list of active reference pictures to be used (forward or backward) to inter code a current picture. The multiple reference pictures originally in the reference list N are indexed in the loop by the integer variable index i which is incremented until the "Last Active Reference?" is detected (decision 370 equals "YES"). The index i is initialized in step 302 to equal 1, which denotes the reference picture in the reference picture list N that follows the zero reference examined in FIG. 2.

An acquisition step 310 acquires all the variable data, including pixel data corresponding to the i-th reference picture in the Reference Picture List N, and determine, access, or calculate the various threshold values to be employed in making the decisions (in the embodiment described by FIG. 3 for example, illustratively; $T_5$ and $T_6$).

In calculation step 320, the macroblock SAD value (MBSAD$_i$) for each of the macroblocks in the i-th reference picture (where i is the index of the reference picture list N) relative to the current picture is calculated for use in ensuing decision step 330.

In decision step 330, if the macroblock SAD values (MBSAD$_i$) of all of the macroblocks in the i-th reference have a macroblock SAD value MBSAD$_i$ larger than a threshold $T_6$, (All MBSAD$_i$>$T_6$) then the YES branch is chosen and reference removal step 360 is performed to remove the i-th reference picture in list N from the active references to be used to inter code the current picture. In decision step 330, if instead all MBSAD$_i$ are not greater than $T_6$, then subsequent calculation step 340 and ensuing decision step 350) is performed.

In calculation step 340, the pictures' MAD value PMAD$_i$ for the i-th reference picture (where i is the Index of the reference picture list N) relative to the current picture is calculated for use in ensuing decision step 350.

In decision step 350, if the pictures' MAD value PMAD$_i$ for the i-th reference picture (where i is the index of the reference picture list) relative to the current picture is above a threshold $T_5$, then the YES branch is chosen and reference removal step 360 is performed to remove the i-th reference picture in list N from the active references to be used to inter code the current picture.

The threshold values of $T_5$ and $T_6$ can be defined differently for each reference picture (e.g., in step 310). For example, if the i-th reference picture in list N is not used for encoding another reference picture that is closer to the current picture, then these thresholds $T_5$ and $T_6$ may be reduced (reduction of the thresholds $T_5$ and $T_6$ implies that the reference picture has higher probability that it shall be removed by step 360 from the active references to be used to inter code the current picture in step 399).

Following the completion of loop RPloop for all of the reference pictures in list N ("Last Active Reference" is "YES" in decision step 370), in list-reordering step 390, the list N may be reordered, excluding those reference pictures removed by step 360, so that the remaining active reference pictures having smaller distortion relative to the current picture shall be placed with higher priority (smaller index numbers) in the reference list N. Thereupon, the current picture may be inter coded in step 399 using the reference list N that has been minimized and reordered by the forgoing series of steps 300 of FIG. 3.

Bi-Prediction

Another embodiment of the invention applies especially to encoding B-pictures. In the case of Bi-predictive (B) inter coding of pictures, considering that B-pictures are usually encoded with a list0 reference and a list1 reference, an additional condition may be imposed, depending upon the motion vectors and reference indices of both references. For example, if all or a very high percentage of the blocks BP (e.g., BP>90%) in the list1 reference picture use the first picture (zero reference) listed in the list0 as a reference, then using only a single reference (the zero reference) for list0 can be beneficial because of the bits saved due to not having to code reference indices into the bit stream. From experimental results, B pictures do not benefit as much as P pictures from the use of multiple references, considering also the high use of direct modes within this picture type, and therefore the multiple references option may be completely disabled without having to perform a further reference number decision, and without much impact in quality.

For B-pictures, it is possible to use both lists for deciding whether a particular reference picture will be kept or not. For example, if the list1 reference picture of a B-picture (e.g. P9 for pictures B7 and B8 in FIG. 1) uses only a single reference picture (e.g., P6) which is also the first reference in list0 and there is a temporal relationship between these pictures, as shown in FIG. 1, then it is very likely that these B-pictures may also be beneficially inter coded using a single reference (e.g., P6) for list0. Further consideration may be given to the distortion of these references relative to the current picture, and also to the motion information, and also whether most blocks in the list1 reference are stationary or not (having zero or close to zero motion) in the manner of the previous examples above described in FIG. 2 and FIG. 3, wherein N would be set to 1 to indicate list 1. If the list0 prediction of a B-picture uses a single reference entirely or in its majority, the decision to encode the B-picture using a single reference will be further indicated, while also motion vectors, and distortion between each reference could again be considered.

Figure 4:
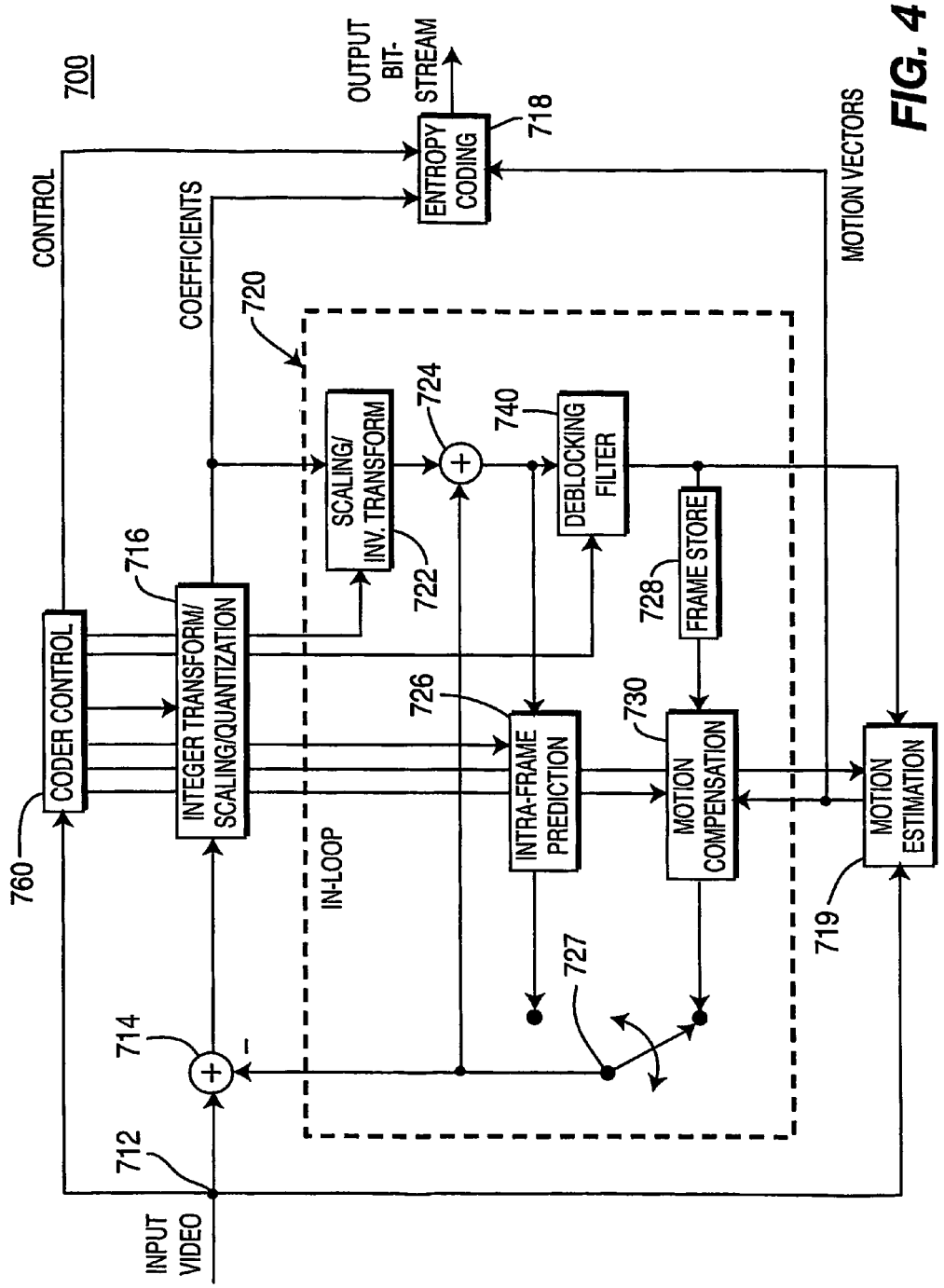
FIG. 4 is a block schematic diagram illustrating a video encoder, in accordance with an embodiment of the invention.

FIG. 4 depicts an exemplary encoder 700 for encoding pixel data (comprising a picture sequence) as a plurality of block transform coefficients, the encoder being adapted to minimize a list of active references to be used to inter code the current picture by performing the decision methods and methodologies disclosed herein. The encoder 700 may include a plurality of circuits, e.g., 760, 716, 728, 730 especially adapted to operate or to interoperate to minimize or optimize a list of active references to be used to inter code a current picture, according to embodiments of the invention, by performing one or more of the methodologies described herein. The encoder 700 includes a video input terminal 712 that Is coupled in signal communication to a positive input of a summing block 714. The summing block 714 is coupled, in turn, to a function block 716 for implementing an integer transform to provide coefficients. The function block 716 is coupled to an entropy coding block 718 for implementing entropy coding to provide an output bitstream. The function block 716 is further coupled to an in-loop portion 720 at a scaling and inverse transform block 722. The function block 722 is coupled to a summing block 724, which, in turn, is coupled to an intra-frame prediction block 726. The intra-frame prediction block 726 is coupled to a first input of switch 727, which, in turn, is coupled to a second input of the summing block 724 and to an inverting input of the summing block 714.

The output of the summing block 724 is further coupled to a deblocking filter 740. The deblocking filter 740 is coupled to a frame store 728. The frame store 728 is coupled to a motion compensation (inter-frame prediction) block 730, which is coupled to a second alternative input of the switch 727. The video input terminal 712 is further coupled to a motion estimation block 719 to provide motion vectors. The deblocking filter 740 is further coupled to a second input of the motion estimation (inter-frame prediction) block 719. The output of the motion estimation block 719 is coupled to the motion compensation (inter-frame prediction) block 730 as well as to a second input of the entropy coding block 718.

The video input terminal 712 is further coupled to a coder control block 760. The coder control block 760 is coupled to control inputs of each of the blocks 716, 718, 719, 722, 726, 730, and 740 for providing control signals to control the operation of the encoder 700. The control signals may include one or more of threshold values $T_1$, $T_2$, $T_R$, $T_3$, $T_H$, $T_4$, $T_{K1}$, $T_{K2}$, $T_5$, $T_6$, or signals functionally equivalent thereto or otherwise incorporating their values.

Various aspects of the present invention can be implemented in software, which may be run on a general purpose computer or any other suitable computing environment. The present invention is operable in a number of general purpose or special purpose computing environments such as personal computers, general-purpose computers, server computers, hand-held devices, laptop devices, multiprocessors, microprocessors, set top boxes, programmable consumer electronics, network PCs, minicomputers, mainframe computers, distributed computing environments and the like to execute computer-executable instructions for performing a frame-to-frame digital video encoding of the present invention, which is stored on a computer readable medium. The present invention may be implemented in part or in whole as computer-executable instructions, such as program modules that are executed by a computer. In general, program modules include routines, programs, objects, components, data structures and the like to perform particular tasks or to implement particular abstract data types. In a distributed computing environment, program modules may be located in local or remote storage devices.

Exemplary embodiments of the invention have been explained above and are shown in the figures. However, the present invention is not limited to the exemplary embodiments described above, and it is apparent that variations and modifications can be effected by those skilled in the art within the spirit and scope of the present invention. Therefore, the exemplary embodiments should be understood not as limitations but as examples. The scope of the present invention is not determined by the above description but by the accompanying claims and variations and modifications may be made to the embodiments of the invention without departing from the scope of the invention as defined by the appended claims and equivalents, wherein i, K and M are integers.

The invention claimed is:

1. In a video encoder, a method of inter coding a pixel region of a current picture in a video sequence of pictures, the sequence including a plurality of references listed in at least one reference list, the method comprising: the step of selecting the first reference listed in a reference list to be used as the only reference to be used to encode the pixel region of the current picture, wherein the step of selecting the first listed reference comprises: a first substep of computing the ratio MBR of the blocks in the pixel region of the current picture having a sum of absolute pixel differences value MBSAD relative to the first listed reference being below a second threshold value $T_2$; wherein if ratio MBR is equal to or greater than a first threshold ratio $TR_R$ then only the first listed reference is used to encode the pixel region.

2. In a video encoder, a method of inter coding a current picture in a video sequence of pictures, the sequence including a plurality of references listed in a reference list, the method comprising: the step of selecting the first reference listed in the reference list to be used as the only reference to be used to encode the current picture, wherein the step of selecting the first listed reference comprises a substep of computing the ratio RK1 of blocks encoded in the first listed reference picture encoded with reference indices equal to zero; wherein if ratio RK1 exceeds a predetermined a threshold ratio $T_{RK1}$, then only the first listed reference is used to encode the current picture.

3. The method of claim 2, wherein the substep of computing the ratio RK1 is performed only if the ratio MBR, of the blocks in the pixel region of the current picture having a block SAD value MBSAD relative to the first listed reference being below a fourth threshold value $T_4$, is equal to or greater than a second predetermined threshold ratio $T_{RH}$.

4. The method of claim 2, wherein the substep of computing the ratio RK1 is performed only of sum of absolute pixel differences within the corresponding pixel regions of the current piture and of first listed reference is less than a third predetermined threshold $T_3$.

5. In a video encoder, a method of inter coding a current picture in a video sequence of pictures, the sequence including a plurality of references listed in a reference list, the method comprising: the step of selecting the first reference listed in the reference list to be used as the only reference to be used to encode the current picture, wherein the step of selecting the first listed reference comprises a substep of computing the ratio RK2 of blocks of the first reference picture having been encoded to have motion vector magnitude components MVx and MVy being equal to or less than predetermined threshold magnitudes TX and TY respectively, wherein if the ratio RK2 is greater than a predetermined threshold percentage $T_{RK2}$, then only the first listed reference shall be used to encode the current picture.

6. The method of claim 5, wherein threshold magnitude TX equals threshold magnitude TY.

7. The method of claim 5, wherein the substep of computing the ratio RK2 is performed only if the sum of absolute pixel differences within the corresponding pixel regions of the current picture and of first listed reference is not less than a first predetermined threshold $T_1$.

8. In a video encoder, a method of inter coding a current picture in a video sequence of pictures using at least one of a plurality of reference pictures listed in a list of active references, the method comprising: the step of removing at least one of the listed references from the list of active references based upon a comparison of each of the removed references to the current picture.

9. The method of claim 8, further comprising the step of reducing num_ref_idx_1N_active_minus1 accordingly, wherein N represents the number of the list of active references.

10. The method of claim 8 wherein the comparison is a direct comparison.

11. The method of claim 10 wherein the step of removing listed references comprises a substep of measuring distortion by calculating the sum of absolute pixel differences between the current picture and each removed reference.

12. The method of claim 10 wherein the step of removing listed references comprises performing, for each reference removed from the list, the substep of computing the number of blocks having a sum of absolute difference values larger than a predetermined threshold $T_6$.

13. The method of claim 12 further comprising dynamically reducing the value of threshold $T_6$ for each reference picture that is not used for encoding another reference picture that is closer in time to the current picture.

14. The method of claim 8 wherein the comparison is an indirect comparison.

15. The method of claim 14 wherein the step of removing at least one of the listed references from the list of active references based upon a comparison of each of the removed references to the current picture includes removing a second reference picture from a list of active references if the second reference picture has high distortion compared to a first reference picture, and the first reference picture has low distortion compared to the current picture.

16. In a video encoder, a method of inter coding a current picture using at least one of a plurality of reference pictures listed in a list of active references, the method comprising: the step of reordering the listed references so that reference pictures having smaller distortion relative to the current picture are listed with higher priority in the list of active references.

17. In a video encoder, a method of inter coding a video sequence of pictures, the method comprising: performing a first coding step of encoding the current picture using all reference pictures listed in a reference picture list; a step of selecting and removing one or more pictures from the reference list to create a new reference list; and then performing a second coding step of re-coding the current picture using only the pictures listed in the new reference list.

18. The method of claim 17, wherein at least one of the selected pictures removed from the reference list is removed because it was not used as a reference in the first coding step for encoding any of the blocks of the current picture.

19. The method of claim 17, wherein at least one of the selected pictures removed from the reference list is removed because in the first step its reference index was used to encode less than a predetermined threshold number of blocks of the current picture.

20. The method of encoding of claim 17, further comprising removing from the active reference list all the pictures not used as reference pictures during the first pass.

21. The method of encoding of claim 17, further comprising computing the number of blocks in the current picture that used a particular indexed reference picture as coding reference in the first pass; and if that number of blocks is less than a predetermined threshold number of blocks, then that particular indexed reference picture is not used to encode the current picture in the second pass.

22. In a video encoder, a method of encoding a video sequence of images, the method comprising:
the step of inter coding the current picture K times, using K permutations of M reference pictures, where K is equal to:

$$K \le \sum_{i=1 \ldots M} \frac{M!}{(M-i)!}$$

followed by the step of selecting one encoded current picture, from among the K encoded current pictures, based upon predetermined criteria in comparison with the other K−1 encoded current pictures.

23. The method of encoding of claim 22, wherein the step of selecting one encoded current picture includes computing and comparing the distortion of each of the K encoded current pictures relative to the current picture to be encoded.

24. The method of encoding of claim 22, wherein the step of selecting one encoded current picture includes computing and comparing the bitrate of each of the K encoded current pictures.

25. The method of encoding of claim 22, wherein the step of selecting one encoded current picture includes computing and comparing the bitrate and distortion of each of the K encoded current pictures, wherein distortion is weighted against bitrate using a Lagrange multiplier.

26. In a video encoder, a method of inter coding a video sequence of pictures, the method comprising: the step of performing motion estimation coding of a current picture using each of a plurality of permutations of available references and selecting the permutation of available references that minimizes a predetermined condition.

27. The method claim 26, wherein predetermined condition is selected from: bitrate, distortion, or weighted combination of bitrate and distortion.

28. The method of claim 26, wherein the selected permutation of available references consists of one single reference, and wherein the predetermined condition minimized is bitrate.

29. The method of claim 26, wherein if the selected permutation of available references consists of one single reference, then further performing the step of recoding the current picture using only the single reference for motion estimation.

30. An encoder for encoding a video sequence of images, the encoder comprising a reference picture buffer, wherein the encoder is adapted to inter code a current picture in the sequence of pictures using at least one of a plurality of reference pictures stored in the reference picture buffer and listed in a reference list; wherein the encoder is further adapted to dynamically select the first listed reference to be used as the only reference to be used to inter code the current picture based upon predetermined criteria, wherein the encoder is further adapted to dynamically select and remove one or more pictures from the list of references stored in the reference picture buffer, to create a new reference list; and to inter code the current picture using only the pictures listed in the new reference list.

31. An encoder for encoding a sequence of images, the encoder comprising a reference buffer, wherein the encoder is adapted to inter code a current picture using at least one of a plurality of reference pictures listed the reference buffer, and adapted to dynamically reorder a list of references stored in the reference buffer so that reference pictures having smaller distortion relative to the current picture are listed with higher priority in the list of active references.

32. The encoder of claim 31, wherein the encoder is further adapted to inter code the current picture using only the first listed reference as the only reference to be used to inter code the current picture if encoding using only the first listed reference meets satisfies a predetermined criteria.

33. The encoder of claim 32, wherein the predetermined criteria includes minimizing the bitrate of the current picture to be encoded.

34. The encoder of claim 32, wherein the predetermined criteria includes minimizing the distortion of the encoded current picture.

* * * * *